July 15, 1924.
G. JACOBS
VARIABLE CONDENSER
Filed Sept. 22, 1922
1,501,402
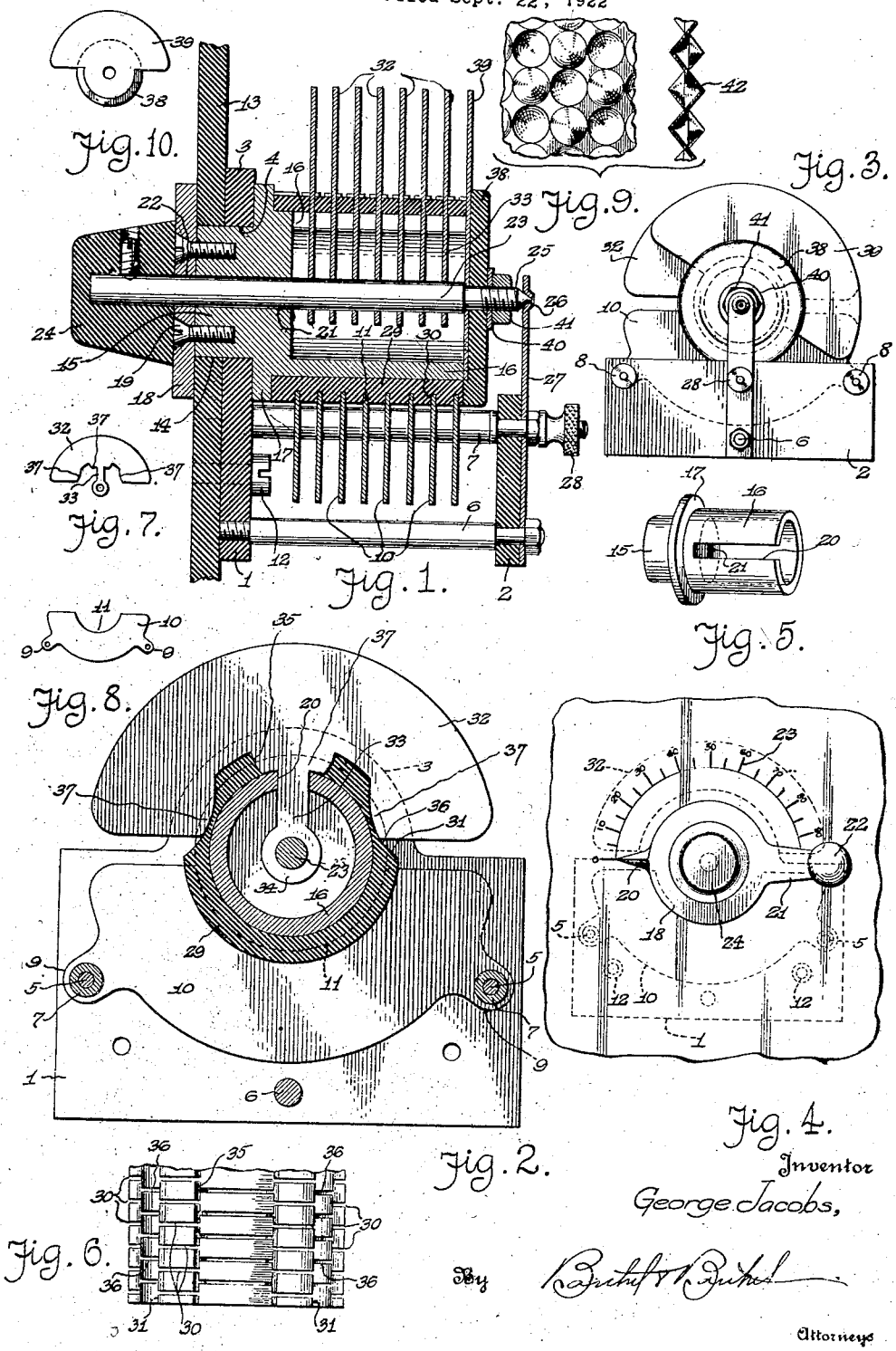
Inventor
George Jacobs,
Attorneys Patented July 15, 1924.

1,501,402

UNITED STATES PATENT OFFICE.

GEORGE JACOBS, OF DETROIT, MICHIGAN.

VARIABLE CONDENSER.

Application filed September 22, 1922. Serial No. 589,883.

*To all whom it may concern:*

Be it known that I, GEORGE JACOBS, a citizen of the United States of America, residing at Detroit, in the county of Wayne and State of Michigan, have invented certain new and useful Improvements in Variable Condensers, of which the following is a specification, reference being had therein to the accompanying drawings.

This invention relates to a variable condenser of that class wherein a stator is composed of a plurality of parallel equally spaced members; a rotor composed of a plurality of parallel spaced members adjustable relative to the members of the stator, and a fine adjustment member adjustable relative to the stator and rotor members, such an arrangement permitting of an approximate adjustment being made between the rotor and the stator and then a minute adjustment made between the fine adjustment member and the adjusted rotor.

In the above class of variable condensers considerable trouble and inaccuracy has been incurred because the members of the stator and rotor have never been firmly braced or held against warping, displacement and other injury, consequently the dielectric area or capacity of the variable condenser, even after an adjustment, has been uncertain and it is with such defects in view that I have devised a novel mounting for the movable member of a variable condenser.

My invention particularly resides in the mounting of the rotor relative to the stator so that the inner edges of members composing the stator or rotor will be positively held against displacement during adjustment of the rotor relative to the stator. There is no possible chance for the members of the rotor or stator to become distorted and vary the dielectric area between the members composing the stator or rotor and after the instrument has been set it may be depended upon without any variance from the duty to be performed, consequently I have a better and more accurate variable condenser for a wireless telephone or telegraph apparatus.

My invention also includes a novel conformation of a stator or rotor member by which better results may be attained.

The construction entering into my variable condenser will be hereinafter specifically described and then claimed and reference will now be had to the drawing, wherein—

Figure 1 is a longitudinal vertical sectional view of a variable condenser in accordance with my invention;

Fig. 2 is a cross sectional view of the same;

Fig. 3 is a view, on a smaller scale, of the rear end of the condenser showing the fine adjustment member;

Fig. 4 is a view of a portion of the front end of the variable condenser;

Fig. 5 is a perspective view of a detached rotor shell;

Fig. 6 is a plan of a portion of a detached rotor insulator;

Fig. 7 is an end view of a detached rotor member;

Fig. 8 is a similar view of a detached stator member;

Fig. 9 shows enlarged views of a portion of a member that may be used in connection with the stator or rotor, and Fig. 10 is an end view of a detached fine adjustment member.

In the drawing, the reference numerals 1 and 2 denote end plates, preferably made of insulation material, for instance, hard rubber or fiber, and the upper edge of the end plate 1 has a semi-circular enlargement or boss 3 provided with a circular opening 4.

Connecting the end plates 1 and 2 and spacing said plates apart are tie rods 5 and 6 with the tie rods 5 provided with spacing sleeves 7 and binding posts 8.

Mounted between the spacing sleeves 7 of the tie rods 5 are the apertured ears or lugs 9 of stator members 10, said members being equally spaced in parallelism and segment shaped in elevation with the upper curved edges 11 thereof disposed relative to the longitudinal axis of the instrument, which axis may be considered as axially or coaxially of the opening 4 in the end plate 1.

The end plate 1 is adapted to be secured by screws 12 or other fastening means to a support 13 made of suitable insulation material, said support having a circular opening 14 in matched registration with the opening 4.

Journaled in the openings 4 and 14 is the hub portion 15 of a cylindrical shell or condenser body 16, best shown in Fig. 5, said shell having a peripheral flange 17 abutting the end plate 1. Co-operating with the flange 17 in retaining the shell in engagement with the end plate 1 and the support 13 is a pointer plate 18 connected to the hub 15 of the shell 16 by screws 19 or other fastening means. The pointer plate 18 has a pointer 20 and a crank 21 provided with a handle 22 by which the shell or body 16 may be rotated with the pointer 20 swingable relative to graduations 23 on the support 13 above the pointer plate 18.

The condenser body or shell 16 has a longitudinal slot 20 and the hub portion 15 has an axial opening or bore 21 alining with an opening 22 in the pointer plate 18. These openings accommodate a shaft or arbor 23 which has its forward end provided with a knob or handle 24, preferably made of insulation material, and the rear end of said shaft terminates in an exteriorly screw-threaded pintle 25 engaging a bearing 26 forming part of an arm 27 extending upwardly from the end plate 2 and attached to said end plate by the tie rod 6 and a binding post 28 carried by the end plate 2. It is now apparent that the shell or condenser body 16 is rotatably supported with the shaft 23 capable of adjustment independent of the shell or condenser body.

Mounted on the shell or condenser body 16 is a sleeve-like insulator 29 provided with circumferential grooves 30 corresponding in number to the stator members 10 and into which grooves the upper curved edges 11 of the stator members extend so that the walls of the grooves 30 will brace the upper edges of the members 10 and cooperate with the spacing sleeve 7 of the tie rods 5 in precluding any warping or distortion of the stator members.

The periphery of the insulator 29 is provided with longitudinal recesses 31 and 35 with the bottom walls of said recesses slotted, as at 36, to receive the inner edges of segment shaped rotor members 32 approximately the area of the stator members 10, said rotor members having edge portions 37 in the recesses 31 and tongues 33 extending through the slot 20 of the shell 16 with the inner ends of the tongues enlarged and apertured, as at 34, to receive the shaft or arbor 23. This is best shown in Fig. 2 and it will be noted that the tongues 33 establish a driving relation between the shell 16 and the rotor members 32. This constructive arrangement of parts necessitates mounting the rotor members 32 on the insulator 29 before the insulator is mounted on the shell 16 and the shaft 23 placed axially thereof.

In order that the rotor members may be assembled on the insulator 29, the recess 35 of the insulator 29 is of greater width than the shell slot 20 and adapted to communicate therewith, it being possible to insert the tongues 33 through the recess 35 as the rotor members are assembled.

With the inner edge portions 37 of the rotor members 32 extending into the grooves or slots in the bottom walls of the recesses 31 and 35, the inner edges of the rotor members will be properly spaced and firmly held, particularly by the insulator material between said members and when the rotor is shifted relative to the stator there will be a defined relation between the stator and rotor members 10 and 32.

Mounted on the pintle 25 of the arbor or shaft 23 is a head 38 made of insulation material and set in said head, as though integral therewith, is a fine adjustment member 39 approximating the area of either of the rotor members 32, said fine adjustment member engaging the end of the insulator 29, also the end shoulder of the arbor or shaft 23, so that the fine adjustment member 39 and the head 28 may be clamped on the arbor or shaft by a washer 40 and a nut 41 on the pintle 25. This arrangement permits of the knob or handle 24 being turned to shift the fine adjustment member 39 relative to either the rotor members 32 or the stator members 10, as best shown in Fig. 3, and after an approximate adjustment has been made by adjusting the rotor members 32 relative to the stator members 10 the fine adjustment member 39 may be shifted for a more minute adjustment of the capacity of the condenser.

Instead of making the stator and rotor members of flat material I may shape said members to afford closely assembled hollow conical protuberances on both sides thereof, such configuration being indicated at 42 in Fig. 9. The advantage of this conformation is that of affording a multiplicity of discharge points between said members, and thus reduce static conditions about the condenser.

What I claim is:—

1. In a variable condenser, stator members, rotor members, a sleeve like insulator supporting the inner edges of said rotor members and provided with grooves to receive the edges of said stator members, a fine adjustment member, and means axially of said insulator and extending through portions of said rotor members for adjusting said fine adjustment member.

2. A variable condenser comprising a rotary shell having a slot, an insulator on said shell, rotor members having edges thereof extending into said insulator and portions thereof extending into the slot of said shell, means axially of said shell and extending through portions of said rotor members for retaining said rotor members thereon, and stator members having edges thereof extending into said insulator.

3. A variable condenser as called for in claim 2, and a fine adjustment member carried by said means and adjustable relative to said rotor and stator members.

4. A variable condenser comprising a shell, an insulator on said shell, a single set of semi-circular rotor members having inner edge portions mounted in said insulator and tongues extending into said shell, a single set of stator members having inner edge portions extending into said insulator and between which stator members said rotor members are movable, means attached to said shell to facilitate rotating said shell and the insulator thereon, and means axially of said shell retaining the tongues of said rotor members therein.

5. A variable condenser as called for in claim 4, and a fine adjustment member carried by the last mentioned means and forming an end wall of said shell and adjustable relative to said rotor and stator members.

6. A variable condenser comprising end members, stator members supported between said end members, a shell having a hub portion journaled in one of said end members, an insulator on said shell, an arbor journaled in the hub portion of said shell and extending therethrough, rotor members on said insulator and retained thereon by said arbor, said stator and rotor members having protuberances, and means to facilitate adjusting said shell.

7. A variable condenser as called for in claim 6, wherein said rotor members have edges set in said insulator, and said insulator has grooves to receive edges of said stator members, and the protuberances of said stator and rotor members protruding from opposite faces thereof.

In testimony whereof I affix my signature in presence of two witnesses.

GEORGE JACOBS.

Witnesses:
CHAS. W. STAUFFIGER,
KARL H. BUTLER.